April 15, 1969   M. E. KRIENKE   3,438,262
VOLUMETRIC SAMPLING
Filed Dec. 22, 1966

INVENTOR.
Marcus E. Krienke
BY
Griswold & Burdick
ATTORNEYS

United States Patent Office 3,438,262
Patented Apr. 15, 1969

3,438,262
VOLUMETRIC SAMPLING
Marcus E. Krienke, Midland, Mich., assignor to The Dow Chemical Company, Midland, Mich., a corporation of Delaware
Filed Dec. 22, 1966, Ser. No. 603,982
Int. Cl. G01n 1/10
U.S. Cl. 73—422                              9 Claims

ABSTRACT OF THE DISCLOSURE

The present invention relates to a constant or proportional volume liquid sampler. It comprises in combination, a sample measuring chamber provided with a check float for controlling the sample volume, said sample measuring chamber being also provided with a sample inlet means connected to a sample supply, a port in communication with a low pressure pump, a sample exit means connected to a sample receiver and an air inlet means. The apparatus automatically backflushes the sample receiving line after each sample and is constructed so that no valves or restrictions come in contact with the sample liquid.

*Background of the invention*

The present invention relates to liquid sampling and more particularly is concerned with a novel apparatus and method for sampling liquids or liquid flows which is not detrimentally affected by suspended solids and/or normally corrosive materials present in the liquid body being sampled.

There are a great many liquid sampling devices in use which are adapted to provide constant or proportional volume samples of liquids from a liquid body such as a reservoir or liquid stream. However, most of the sampling devices now in use contain valves and other restrictions which restrict the flow of the liquids to be sampled. Because of these valves and restrictions, these sampling devices do not function properly when the liquid to be sampled contains suspended solids, is made up of materials subject to polymer buildup or is contaminated with dirt, abrasives and other foreign matter. Likewise, the devices now being employed, because of their material of construction, are not applicable for use with many liquids which corrosively attack the various components of the apparatus.

*Summary of invention*

The apparatus of the present invention overcomes these previous handicaps and problems by eliminating, by its unique design, all mechanical valves and other restrictions as employed in the devices known heretofore. Also, because of the design of the present apparatus, construction materials can be utilized which are substantially inert to the liquids being sampled. Likewise, the apparatus automatically backflushes the sample line after each sample has been taken, thus eliminating problems with clogging caused by suspended solids and polymer buildups.

It is therefore a principal object of the present invention to provide a novel apparatus and method which can be utilized for constant or proportional volume sampling.

It is also an object to provide a constant or proportional volume liquid sampler which is substantially unaffected by the nature of the liquid desired to be sampled.

It is another object of the present invention to provide a novel liquid sampling apparatus which is operable for delivering constant or proportional volumes of a liquid containing solid matter.

It is a further object to provide a constant or proportional volume liquid sampler which automatically backflushes the sample receiving line after each sample is taken.

These and other objects and advantages will become readily apparent from a reading of the detailed description of the invention as presented herein in light of the appended drawings wherein:

*Description of the preferred embodiments*

Figure 1:
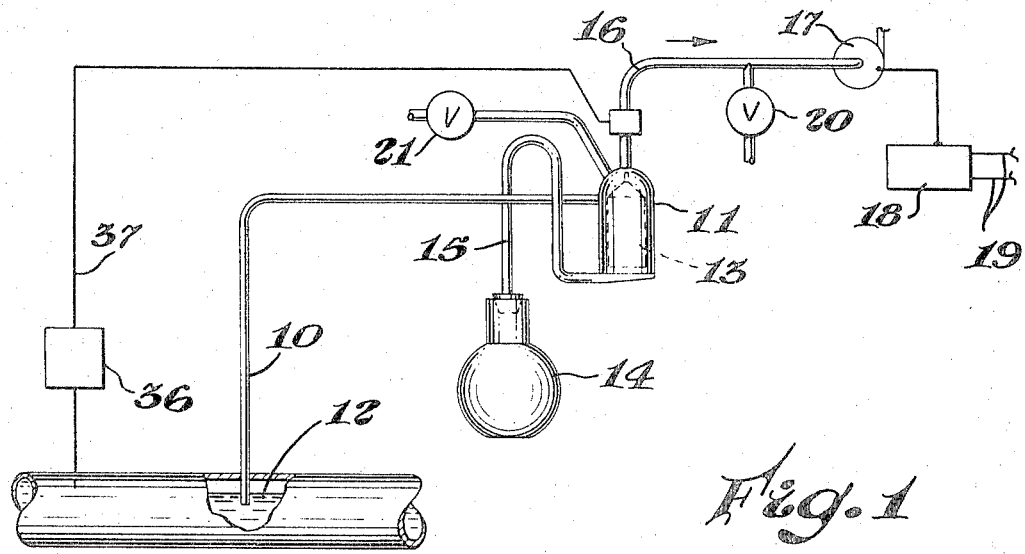
FIGURE 1 represents a schematic diagram of the apparatus of the present invention in operable appendage with a liquid supply.

The apparatus of the present invention essentially comprises, as depicted in FIGURE 1, a sample receiving line 10 which connects a sample measuring chamber 11 and a liquid body 12 to be sampled. The chamber 11 has positioned therein a check float 13 which controls the volume of sample introduced into the chamber 11. The sample measuring chamber 11 is connected to a sample receiver 14 by a sample exit line 15. The sample measuring chamber 11 is also adapted to a pressure line 16 which in turn is connected to a low pressure pump 17, commonly referred to as a vacuum pump, which derives its power from a programming device 18, for example an electric timer, which is connected to a power source 19. The pressure line 16 is provided with a pressure adjustment means 20. The sample measuring chamber 11 is also provided with a pressure release means 21, such as an air or gas bleeding means.

Figure 2:
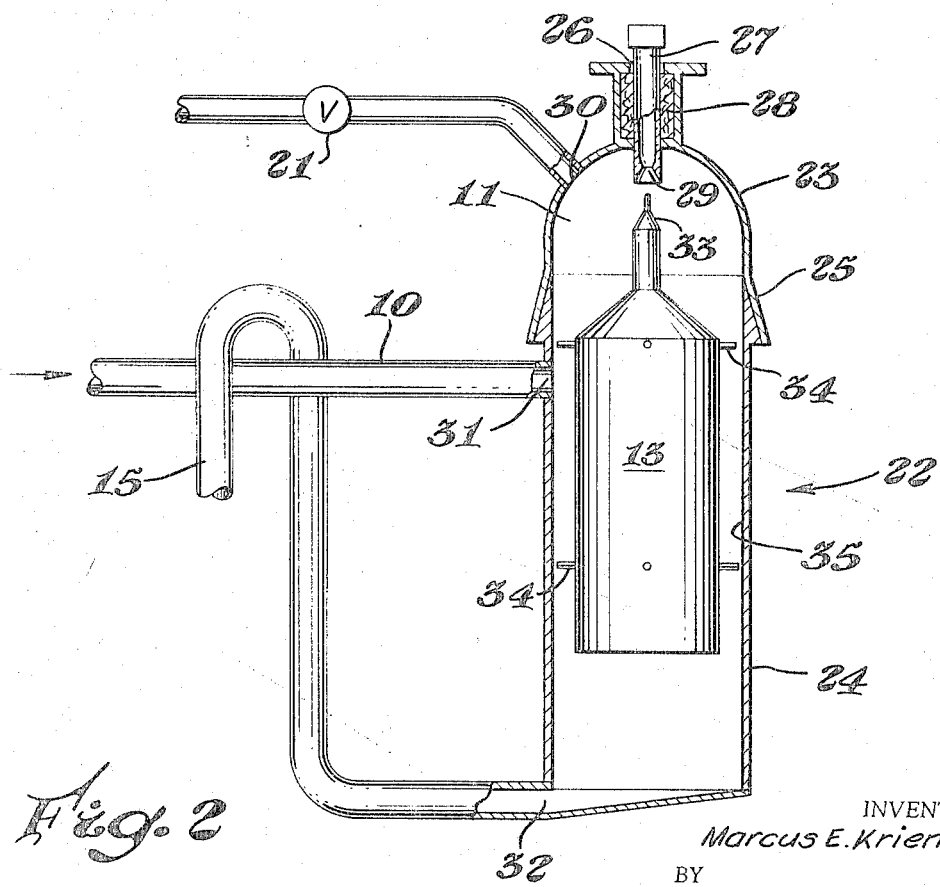
FIGURE 2 is an elevation, partly in section of a sample measuring chamber which may be used in the apparatus of the present invention.

One embodiment of a sample measuring chamber 11 which can be employed in the apparatus of the present novel invention is depicted in detail in FIGURE 2. The sample measuring chamber 11 comprises a hollow vessel 22 consisting of a top member 23 and a bottom member 24. These members are detachably fitted together by means of a mating tapered shoulder joint assembly 25, forming a gas and liquid tight connection. The top member 23 is provided with a port 26 ordinarily substantially centered therein. A hollow seating rod 27 is centrally positioned and held or maintained within the port by means of a packing seal 28 and extends entirely therethrough. The other end of the seating rod 27 outside the vessel 22 is connected to a pressure line (not shown) communicating with a low pressure pump (not shown). The lower end of the seating rod 27 extends into the top member 23 and is provided with a female seating joint 29 at its lower extremity. The seating rod 27 is adapted through the port 26 in the top member 23 in such a manner that it can be lowered or raised, thereby allowing the female seating joint 29 to be maintained and sealed at a predetermined position inside the top member 23. When the female seating joint is positioned at a predetermined level a series of samples may then be taken which are of equal volume. The top member 23 is also provided with a gas inlet port 30 positioned near the upper portion of said member. The gas inlet port is designed so as to be adaptable to a pressure release means 21, such as a gas bleeding means.

The bottom member 24 of the vessel 22 is provided with a sample inlet port 31 which is connected to a sample receiving line 10. The bottom member is also provided with a sample exit port 32 which connects to a sample exit line 15. The sample exit line 15 is positioned as shown to provide a liquid leg in said line when the sample measuring chamber 11 has a liquid contained therein. The liquid leg formed by the positioned sample exit line 15 prevents a liquid sample in the sample measuring chamber 11 from draining to the sample receiver 14 until a predetermined volume of liquid is introduced therein. Located within the sample measuring chamber 11 is a check float 13 which is provided with a male seating joint 33 at its upper extremity which mates with the female seating joint 29 providing a gas and liquid tight seal. The float check 13 is further provided with protruding members 34, or other members such as washers, or ridges, which assures a sliding engagement of said float with the inner face of the hollow vessel 22 and prevents the check float from binding with the inner face 35 of the sample measuring chamber 11.

Although the specific embodiment described herein comprises an essentially spherical shaped vessel 22, it is understood that a variety of vessels of different shapes and sizes may be employed in the present apparatus. Likewise, it is also appreciated that a number of different seating joints may be substituted for the female and male seating joints 29 and 33 and check floats of various sizes and shapes may be employed in the apparatus as described herein. The novel apparatus herein described lends itself to various modifications which fit particular sampling needs without departing from the present novel invention.

With the apparatus of the present invention, a series of liquid samples of constant volume may be taken at predetermined time intervals. The system as indicated is provided with a low pressure pump 17 which is connected to the sample measuring chamber 11. The vacuum pump employed in the operation of the apparatus should be of sufficient capacity and power to develop a reduced pressure of at least 20 inches of Hg. The power supply 19 to operate the pump can be directed through a timing or programming device 18 which is set to turn the vacuum pump on and off at predetermined intervals, thereby obtaining a series of samples of constant volume. It is understood that it is also possible to manually activate the low pressure pump if the programming device is not essential to a specific sampling operation.

When the apparatus is assembled in a manner as heretofore described and the now pressure pump 17 is activated a partial vacuum is created inside the sample measuring chamber 11. The strength of the partial vacuum is controlled by adjusting the pressure release means 21 in conjunction with the pressure adjustment means 20. The partial vacuum is adjusted to pull a steady nonviolent stream of the liquid to be sampled into the sample measuring chamber 11 through the sample receiving line 10, and, in addition, adequate pressure is required to securely hold the male seating joint 33 of check float 13 in position with the female seating joint 29 after a predetermined volume of liquid has been introduced into the sample measuring chamber and until the pump 17 is shut off.

After adjusting the partial vacuum, the programming device 18 is set to operate the pump 17 at predetermined time intervals and the sample receiving line is positioned in a liquid body to be sampled 12. When the vacuum pump is activated a predetermined partial vacuum, as indicated, is created in the sample measuring chamber 11. By reason of the thus created partial vacuum the liquid to be sampled is drawn into the sample measuring chamber 11 through the sample receiving line 10. The inflow of the liquid causes the check float 13 to rise as the fluid rises causing the male seating joint 33 to mate in the female seating joint 29 provided in the seating rod 27 when a predetermined volume of liquid is introduced therein. The actual volume of sample is determined by the position of the seating rod 27, this having been set at a predetermined height in the sample measuring chamber 11. The liquid drawn into the sample measuring chamber 11, as heretofore indicated, is prevented from prematurely draining into the sample receiver 14 by reason of the fact that a liquid leg is created in the sample exit line 15 because of its position in relation to the sample measuring chamber. As the check float 13 seats, air or an inert gas flows into the partially evacuated system through the pressure release means 21 which has been preset to adjust the partial vacuum in a manner as hereinbefore described. The flow of gas causes the sample measuring chamber 11 to return to atmospheric pressure. Any liquid remaining in the sample receiving line 10 drains back into the liquid body to be sampled 12, thus automatically backflushing the line. The flow of air or other inert gas into the sample measuring chamber 11 also forces the liquid sample out of the chamber and through the sample exit line 15, and into the partially evacuated sample receiver 14. The liquid from the sample measuring chamber is drawn into the sample receiver 14 through the sample exit line 15 by reason of the pressure differential between the sample measuring chamber 11 and the sample receiver 14. Once the sample liquid has drained into the sample receiver 14, the programming device 18 deactivates the pump 17 and the check float 13 disengages from the female seating joint 29 in the seating rod 27. The apparatus is thus positioned so that the procedure indicated is repeated each time the vacuum pump is activated.

The apparatus, as indicated, is provided with a hollow seating rod 27. The seating rod 27 is ordinarily constructed and adapted to the sample measuring chamber 11 so as to be adjustable. By using an adjustable assembly, the volume of liquid to be sampled may be varied within selected limits by moving the position of the rod up or down within the sample measuring chamber 11. For example, when the seating rod is lowered, the female seating joint 29 protrudes further into the chamber and the check float 13 travels a shorter distance before it engages the female seating joint 29. Thus a lesser quantity of liquid is drawn into the sample measuring chamber than if the seating rod were in a higher position.

As a specific embodiment of the present invention the sampling device can be made to take a sample size which is proportional to the flow rate of a liquid stream to be sampled. To permit proportional sampling the apparatus as described is assembled to include a flow rate indicator 36 positioned so as to indicate the flow rate of a liquid stream to be sampled 12. The flow rate indicator 36 is adapted to a driving means 37 which in turn is connected to the hollow adjustable seating rod 27. The flow rate indicator 36 is adapted to the driving means 37 in such a manner that the driving means moves the adjustable seating rod 27 up or down a distance which is proportional to the rate of flow of the liquid to be sampled. The driving means 37 may comprise a cam linkage assembly or any other suitable driving means may be employed. Since the size of the sample taken in a given apparatus assembly is determined by the distance the check float 13 must travel before it engages the female seating joint 29 of the hollow seating rod 27 a sample proportional to the rate of flow of the liquid is taken when the present apparatus is adapted as indicated herein.

The sample measuring chamber 11 may be constructed of a two membered vessel as indicated in FIGURE 2 or a single unit vessel may be employed. By using the two member construction, large volume changes can be made in the apparatus by substituting a smaller or larger bottom member 24. Smaller volume changes as indicated hereinbefore, are made by adjusting the hollow seating rod 27 which changes the height of the female seating joint 29 within the sample measuring chamber 11.

The material of construction used in the sample measuring chamber 11 and the check float 13 may be any material which is substantially inert to the liquids to be sampled and also of sufficient strength to withstand the partial vacuum created in the system. Because of the ease of manufacture and substantial inertness to most liquids, Pyrex glass has proven to be a very useful construction material. Polymeric resins and metals can be used for operations when glass might be detrimentally attacked by the liquid being sampled.

The sample receiving line 10 may be of any pressure tubing with sufficient wall strength that it does not collapse under the partial vacuum developed in the system. Heavy rubber tubing may be employed or other tubing such as polyethylene, Teflon, tetrafluoroethylene resins, epoxy resins, thick walled glass, metal and the like may be used.

To make the connections between the sample measuring chamber 11 and the sample receiving line 10, the sample exit line 15 and the pressure line 16, heavy walled rubber tubing may be used or glass ball joints or any other material or jointed construction that will not collapse under the vacuum created in the system may be employed.

The vacuum pump 17 and programming device 18 may be of any standard construction and as heretofore indicated a low pressure pump capable of creating at least 20 inches of Hg is preferred.

The apparatus of the present invention is suited for taking constant or proportional volume samples and in actual operation has found particular utility in sampling acidic sewer effluent streams wherein the liquid tested has heretofore caused corrosive and particulate problems in prior sampling devices. The present apparatus does not have any mechanical valves or other restrictions that come into direct contact with the sample liquid, thus, problems of clogging are eliminated. The present apparatus is also constructed so that the sample receiving line is backflushed automatically after each sample, thus preventing clogging or polymer buildup.

One embodiment of the present novel apparatus has been set forth in detail in the present specification but it should be understood that this is for illustrative purposes only and that modifications can be made in the apparatus and mode of using the apparatus without departing from the scope or spirit of the instant invention.

I claim:

1. A liquid volumetric sampling apparatus which comprises in combination:
    (a) a sample measuring chamber comprising a hollow vessel;
    (b) a check float positioned in said hollow vessel, said check float provided with a seating joint at its top;
    (c) a sample receiving line communicating between said sample measuring chamber and a liquid supply source;
    (d) a sample exit line connected to said sample measuring chamber, said sample exit line being designed to form a liquid leg with liquid from said sample measuring chamber;
    (e) a sample receiver connected to said sample exit line;
    (f) a pressure line connected to said sample measuring chamber, one end of said pressure line providing a seating joint mating with the seating joint of said check float;
    (g) a pressure adjustment means connected to said pressure line;
    (h) a vacuum pump connected to said pressure line and connected to a power source; and
    (i) a pressure release means connected to said sample measuring chamber.

2. A liquid volumetric sampling apparatus as defined in claim 1, including the following additional element:
    (a) a programming device connected to said vacuum pump and a power source, for starting and stopping said vacuum pump in accordance with a preset program.

3. A liquid volumetric sampling apparatus as defined in claim 1 wherein said sample measuring chamber comprises:
    (a) a hollow vessel having a port centrally positioned near its upper extremity, said sample receiving line being connected to said sample measuring chamber at a sample inlet port located near the top of said vessel, said pressure line being connected to said sample measuring chamber at a gas inlet port located near the top of said vessel and separated from said sample inlet port and a sample exit port located at the bottom of said vessel;
    (b) a check float positioned in said hollow vessel, said check float having a seating joint provided at its top portion and said check float having protruding members positioned along its body portion, said protruding members assuring a sliding engagement of said check float with the inner face of said hollow vessel and preventing said check float from binding in said vessel; and
    (c) a hollow seating rod positioned in said port centrally positioned in the upper extremity of said hollow vessel, one end of said seating rod extending through said port and into said vessel, said hollow seating rod being provided with a seating joint in the end extending into said vessel, said seating joint mating with the seating joint provided in the top portion of said check float.

4. The sample measuring chamber as defined in claim 3 wherein said sample measuring chamber is characterized by a single unit hollow vessel.

5. The sample measuring chamber as defined in claim 3 wherein said sample measuring chamber is characterized by a two-member hollow vessel comprising:
    (a) a top member having provided therein a port centrally positioned near its upper extremity, and with said gas inlet port; and
    (b) a bottom member having positioned therein a sample inlet port near the upper portion of said member, said exit port being at the bottom of said member, said top and bottom members being detachably fitted together by a mating tapered shoulder joint assembly forming a gas and liquid tight connection.

6. The sample measuring chamber as defined in claim 3 wherein the hollow seating rod is adjustably positioned in said port centrally positioned near its upper extremity.

7. A liquid volumetric sampling apparatus as defined in claim 1, including the following additional elements:
    (a) said pressure line including an adjustable hollow seating rod positioned in a port centrally positioned in the upper extremity of said hollow vessel, one end of said seating rod extending through said port and into said vessel, said hollow seating rod being provided with a seating joint in the end extending into said vessel, said seating rod mating with the seating joint provided in the top of said check float and connected at its other end to said pressure line;
    (b) a flow rate measuring device adapted to be connected in a liquid supply stream comprising the liquid supply source; and
    (c) a driving mechanism responsive to said flow rate measuring device and adapted to move said adjustable seating rod in a manner so as to raise and lower the adjustable seating rod in said port a distance proportional to the flow rate of said liquid supply stream.

8. A method for the volumetric sampling of liquids comprising:
    (a) providing a sample measuring chamber comprising a hollow vessel having a check float therein, said check float provided with a seating joint at the top; a sample receiving line communicating between said sample measuring chamber and a liquid supply source; a sample exit line connecting said sample measuring chamber and a sample receiver, said sample exit line designed to form a liquid leg with liquid from said sample measuring chamber; a pressure line, one end of which provides a seating joint mating with the seating joint of said check float in said sample measuring chamber and the other end of which is connected to a vacuum pump; and a pressure release means connected to said sample measuring chamber;

(b) introducing liquid from said liquid supply source into said sample measuring chamber by providing a partial vacuum in said sample measuring chamber;

(c) continuing the flow of liquid into said chamber while said check float rises therein;

(d) stopping the flow of said liquid into said chamber as said check float mates with the seating joint in said pressure line and said sample measuring chamber returns to normal atmospheric pressure;

(e) transferring the liquid from said sample measuring chamber through said sample exit line into said sample receiver; and (f) automatically backflushing the sample receiving line after sampling, and draining any liquid remaining therein after the sample measuring chamber returns to normal atmospheric pressure back into the liquid supply source.

9. The method as described in claim 8 wherein said sample is automatically taken at predetermined time intervals by automatically activating and deactivating the vacuum pump at predetermined time intervals.

References Cited
UNITED STATES PATENTS

| | | | |
|---|---|---|---|
| 2,713,268 | 7/1955 | Langsenkamp | 73—422 |
| 2,836,978 | 6/1958 | Warren | 73—422 |
| 3,209,598 | 10/1965 | Anderson et al. | 73—422 |

LOUIS R. PRINCE, *Primary Examiner.*

HARRY C. POST III, *Assistant Examiner.*